United States Patent
Oulès et al.

(10) Patent No.: US 11,790,572 B1
(45) Date of Patent: Oct. 17, 2023

(54) DIGITIZATION OF WHITEBOARDS

(71) Applicant: GoPro, Inc., San Mateo, CA (US)

(72) Inventors: Guillaume Oulès, Bordeaux (FR); Daryl Stimm, Encinitas, CA (US)

(73) Assignee: GoPro, Inc., San Mateo, CA (US)

( * ) Notice: Subject to any disclaimer, the term of this patent is extended or adjusted under 35 U.S.C. 154(b) by 36 days.

(21) Appl. No.: 17/557,719

(22) Filed: Dec. 21, 2021

(51) Int. Cl.
| | |
|---|---|
| *H04N 7/15* | (2006.01) |
| *G06T 7/11* | (2017.01) |
| *G06V 10/20* | (2022.01) |
| *G06T 11/00* | (2006.01) |
| *G06V 10/22* | (2022.01) |
| *G06T 1/60* | (2006.01) |
| *G06T 7/50* | (2017.01) |

(52) U.S. Cl.
CPC ............... *G06T 11/00* (2013.01); *G06T 1/60* (2013.01); *G06T 7/11* (2017.01); *G06T 7/50* (2017.01); *G06V 10/225* (2022.01); *G06V 10/255* (2022.01); *H04N 7/15* (2013.01); *G06T 2207/20021* (2013.01)

(58) Field of Classification Search
CPC ... G06T 11/00; G06T 7/50; G06T 7/11; G06T 1/60; G06T 2207/20021; G06V 10/255; G06V 10/225
See application file for complete search history.

(56) References Cited

U.S. PATENT DOCUMENTS

| | | | | |
|---|---|---|---|---|
| 2010/0245563 | A1* | 9/2010 | Golovchinsky | H04N 7/18 348/135 |
| 2012/0113238 | A1* | 5/2012 | Yamamoto | H04N 7/142 348/61 |
| 2015/0271446 | A1* | 9/2015 | Browne | H04N 7/15 348/14.08 |
| 2017/0149999 | A1* | 5/2017 | Jeevanantham | H04N 1/32144 |
| 2017/0372449 | A1* | 12/2017 | Yarvis | G06T 3/0018 |
| 2018/0232192 | A1* | 8/2018 | Timoner | G09G 3/2003 |
| 2019/0037171 | A1* | 1/2019 | Nagpal | H04L 12/1822 |

* cited by examiner

*Primary Examiner* — Lixi C Simpson
(74) *Attorney, Agent, or Firm* — ESPLIN & ASSOCIATES, PC (57) ABSTRACT

Depiction of a physical whiteboard may be captured by an image capture device. The depiction of the physical whiteboard may be detected and used to generate a virtual whiteboard. A change in the depiction of the physical whiteboard may be detected and used to change the virtual whiteboard. A virtual change to the virtual whiteboard may be received and used to change the virtual whiteboard. The change to the virtual whiteboard based on the virtual change may be projected on top of the physical whiteboard.

20 Claims, 7 Drawing Sheets

FIG. 6

DIGITIZATION OF WHITEBOARDS

FIELD

This disclosure relates to digitization of physical whiteboards for generation of virtual whiteboards.

BACKGROUND

A physical whiteboard is easy to use but limits contributions from remote user. A virtual whiteboard allows remote users to work together but may be cumbersome to use.

SUMMARY

This disclosure relates to digitizing whiteboards. Visual information and/or other information may be obtained. The visual information may define visual content captured by one or more image capture devices during a capture duration. The visual content may include depiction of a physical whiteboard. The depiction of the physical whiteboard within the visual content may be detected. A virtual whiteboard may be generated based on the depiction of the physical whiteboard detected within the visual content and/or other information. One or more changes in the depiction of the physical whiteboard within the visual content may be detected. The virtual whiteboard may be changed based on the change(s) in the depiction of the physical whiteboard within the visual content and/or other information.

A system for digitizing whiteboards may include one or more electronic storage, processor, and/or other components. The electronic storage may store visual information, information relating to visual content, information relating to an image capture device, information relating to a physical whiteboard, information relating to a virtual whiteboard, and/or other information.

The processor(s) may be configured by machine-readable instructions. Executing the machine-readable instructions may cause the processor(s) to facilitate digitizing whiteboards. The machine-readable instructions may include one or more computer program components. The computer program components may include one or more of a visual information component, a depiction component, a generation component, a physical change component, a virtual change component, a whiteboard change component, a projection component, and/or other computer program components.

The visual information component may be configured to obtain visual information and/or other information. The visual information may define visual content captured by one or more image capture devices during a capture duration. The visual content may include depiction of a physical whiteboard.

The depiction component may be configured to detect the depiction of the physical whiteboard within the visual content. The depiction of the physical whiteboard within the visual content may be detected based on analysis of the visual content and/or other information.

The generation component may be configured to generate a virtual whiteboard. The virtual whiteboard may be generated based on the depiction of the physical whiteboard detected within the visual content and/or other information. In some implementations, a shape of the physical whiteboard within the visual content is determined, and the shape of the virtual whiteboard is modified based on the shape of the physical whiteboard and/or other information.

The physical change component may be configured to detect one or more changes in the depiction of the physical whiteboard within the visual content. The change(s) in the depiction of the physical whiteboard within the visual content may be detected based on analysis of the visual content and/or other information.

In some implementations, the change(s) in the depiction of the physical whiteboard within the visual content may be detected based on: segmentation of the depiction of the physical whiteboard from other depiction within the visual content to identify a target zone of the visual content that includes the depiction of the physical whiteboard; and detection of the change(s) within the target zone of the visual content. In some implementations, the target zone of the visual content may be reidentified based on movement of the image capture device and/or other information.

The virtual change component may be configured to receive one or more virtual changes to the virtual whiteboard. The virtual change(s) to the virtual whiteboard may be received from one or more users. In some implementations, the virtual change to the virtual whiteboard may include addition of one or more virtual media items to the virtual whiteboard. The virtual media item(s) may include one or more of a virtual document, a virtual image, or a virtual video.

The whiteboard change component may be configured to change the virtual whiteboard. The virtual whiteboard may be changed based on the change(s) in the depiction of the physical whiteboard within the visual content and/or other information. The virtual whiteboard may be changed based on the virtual change(s) to the virtual whiteboard received from the user(s) and/or other information.

The projection component may be configured to project the change(s) to the virtual whiteboard. The change(s) to the virtual whiteboard based on the virtual change(s) to the virtual whiteboard may be projected on top of the physical whiteboard and/or other locations. In some implementations, the projection of the change(s) to the virtual whiteboard on top of the physical whiteboard may include projection of one or more changed images with the change(s) to the virtual whiteboard and projection of one or more blank images without the change to the virtual whiteboard. One or more other changes in the depiction of the physical whiteboard within the visual content may be detected from the visual content captured while the projection includes the blank image(s) without the change to the virtual whiteboard.

In some implementations, the blank image(s) may include one or more markers to identify itself as the blank image(s) from which the other change(s) in the depiction of the physical whiteboard are to be detected.

In some implementations, the visual content may be stored within one or more video files. The visual content may have a progress length. One or more moments within the progress length corresponding to the change(s) in the depiction of the physical whiteboard may be flagged as one or more highlight moments.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
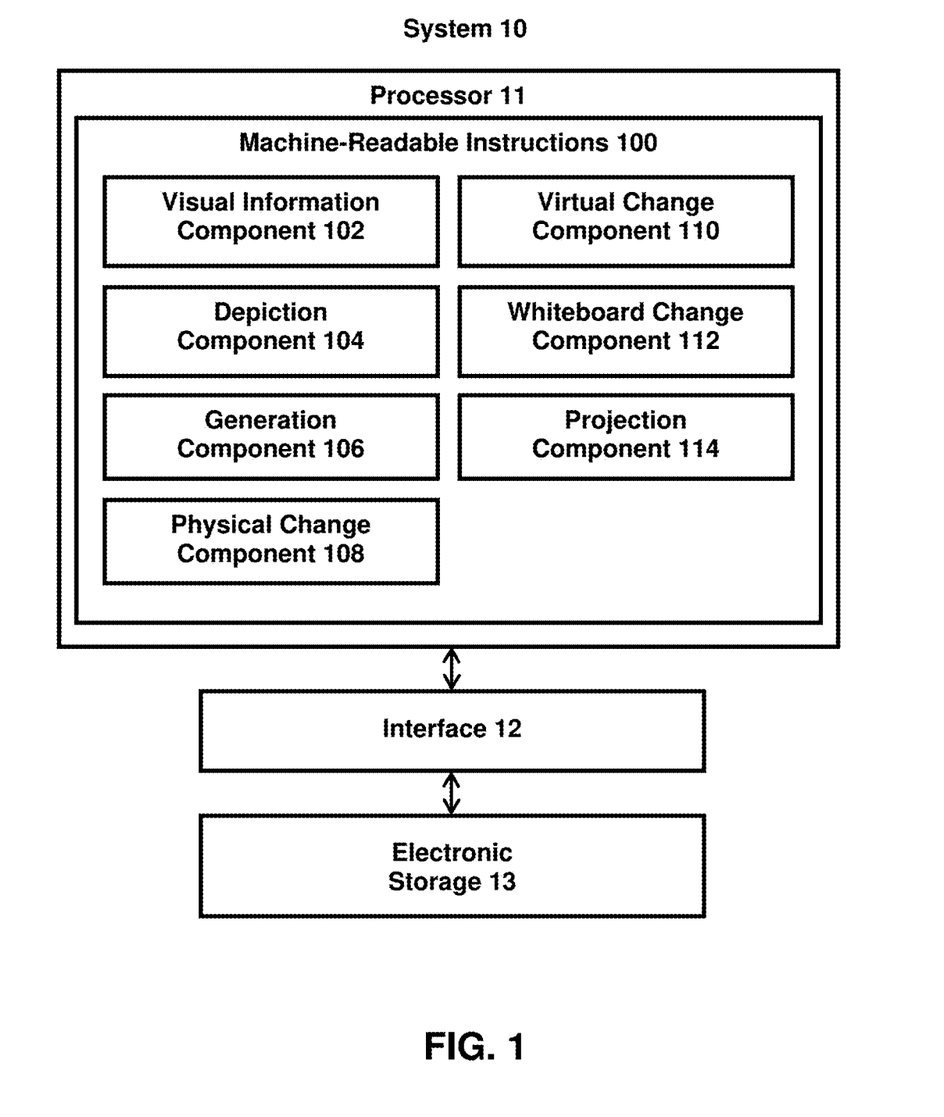
FIG. 1 illustrates a system for digitizing whiteboards.

FIG. 1 illustrates a system 10 for digitizing whiteboards. The system 10 may include one or more of a processor 11, an interface 12 (e.g., bus, wireless interface), an electronic storage 13, and/or other components. Visual information and/or other information may be obtained by the processor 11. The visual information may define visual content captured by one or more image capture devices during a capture duration. The visual content may include depiction of a physical whiteboard. The depiction of the physical whiteboard within the visual content may be detected by the processor 11. A virtual whiteboard may be generated by the processor 11 based on the depiction of the physical whiteboard detected within the visual content and/or other information. One or more changes in the depiction of the physical whiteboard within the visual content may be detected by the processor 11. The virtual whiteboard may be changed by the processor 11 based on the change(s) in the depiction of the physical whiteboard within the visual content and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information, information relating to visual content, information relating to an image capture device, information relating to a physical whiteboard, information relating to a virtual whiteboard, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate digitizing whiteboards. The machine-readable instructions 100 may include one or more computer program components. The machine-readable instructions 100 may include one or more of a visual information component 102, a depiction component 104, a generation component 106, a physical change component 108, a virtual change component 110, a whiteboard change component 112, a projection component 114, and/or other computer program components.

The visual information component 102 may be configured to obtain visual information and/or other information. Obtaining visual information may include one or more of accessing, acquiring, analyzing, determining, examining, generating, identifying, loading, locating, opening, receiving, retrieving, reviewing, selecting, storing, and/or otherwise obtaining the visual information. The visual information component 102 may obtain visual information from one or more locations. For example, the visual information component 102 may obtain visual information from a storage location, such as the electronic storage 13, electronic storage of information and/or signals generated by one or more sensors, electronic storage of a device accessible via a network, and/or other locations. The visual information component 102 may obtain visual information from one or more hardware components (e.g., an image sensor) and/or one or more software components (e.g., software running on a computing device).

The visual information may define visual content and/or other content. Visual content may refer to content of image(s), video frame(s), and/or video(s) that may be consumed visually. For example, visual content may be included within one or more images and/or one or more video frames of a video. The video frame(s) may define/contain the visual content of the video. That is, the video may include video frame(s) that define/contain the visual content of the video. Video frame(s) may define/contain visual content viewable as a function of progress through a progress length (e.g., duration) of the video. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

The visual information may define visual content captured by one or more image capture devices during a capture duration. An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet). An image capture device may include a single image sensor or multiple image sensors.

A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

The visual information may define visual content by including information that defines one or more content, qualities, attributes, features, and/or other aspects of the visual content. For example, the visual information may define visual content by including information that makes up the content of images/video and/or information that is used to determine the content of the images/video. For instance, the visual information may include information that makes up and/or is used to determine the arrangement of pixels, characteristics of pixels, values of pixels, and/or other aspects of pixels that define visual content of a video. Other types of visual information are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

The visual content may include depiction of one or more things. One or more video frames of a video may include depiction of one or more things. The visual content may include depiction of a living thing and/or a non-living thing. The visual content may include depiction of the entirety of a thing or one or more parts of the thing. For example, the visual content may include depiction of a physical whiteboard. A physical whiteboard may refer to a whiteboard that physically exists in the real world. A physical whiteboard may refer to a wipeable board on which writing instruments may be used to make one or more marks. The surface of the physical whiteboard may be composed of one or more colors. For example, the surface of the physical whiteboard may be white, black, and/or other colors.

Figure 3:
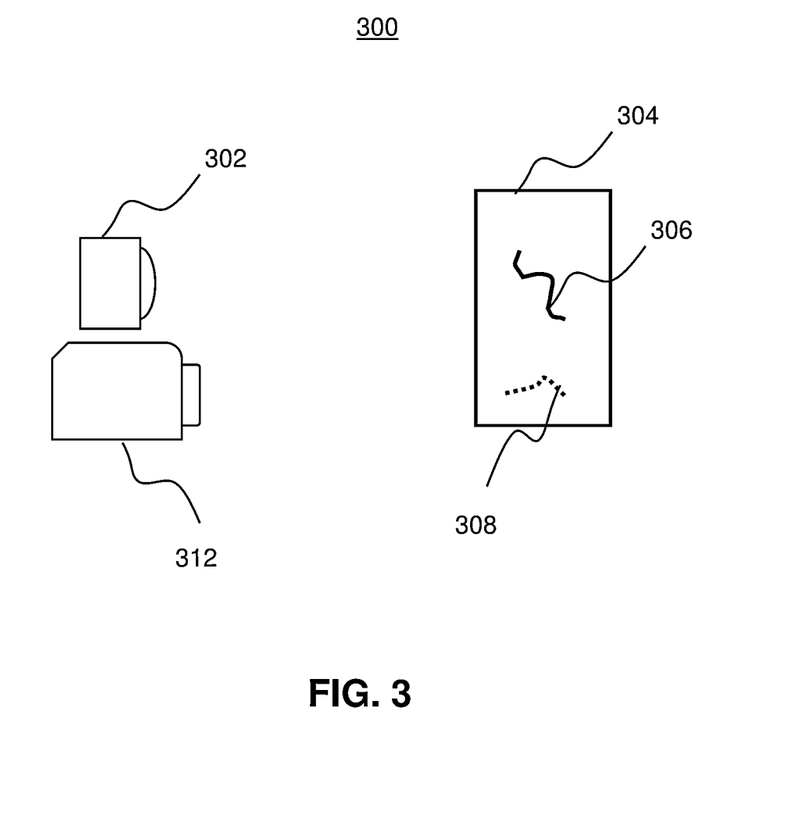
FIG. 3 illustrates an example scenario for digitizing whiteboards.

FIG. 3 illustrates an example scenario 300 for digitizing whiteboards. In scenario 300 may include an image capture device 302 and a whiteboard 304. The whiteboard 304 may be within the field of view of the image capture device 302. The image capture device 302 may capture visual content during a capture duration. The visual content captured by the image capture device 302 may include depiction of the whiteboard 304.

The depiction component 104 may be configured to detect the depiction of the physical whiteboard within the visual content. Detecting the depiction of the physical whiteboard within the visual content may include one or more of determining, discerning, discovering, finding, identifying, spotting, and/or otherwise detecting the depiction of the physical whiteboard within the visual content. For example, detecting the depiction of the physical whiteboard within the visual content may include determining the placement of the depiction of the physical whiteboard within the visual content. Detecting the depiction of the physical whiteboard within the visual content may include determining the shape, boundary, and/or edges of the depiction of the physical whiteboard within the visual content. Other detection of the depiction of the physical whiteboard within the visual content is contemplated.

The depiction of the physical whiteboard within the visual content may be detected based on analysis of the visual content and/or other information. Analysis of the visual content may include examination, evaluation, processing, studying, and/or other analysis of the visual content. For example, analysis of the visual content may include examination, evaluation, processing, studying, and/or other analysis of one or more visual features/characteristics of the visual content. Analysis of the visual content may include analysis of visual content of a single image/video frame and/or analysis of visual content of multiple images/video frames. For example, visual features and/or visual characteristics of a single image may be analyzed to determine whether a physical whiteboard is depicted within the visual content. Visual features and/or visual characteristics of multiple images (e.g., captured at different moment, captured over a duration of time) may be analyzed to determine whether a physical whiteboard is depicted within the visual content. In some implementations, the depiction component 104 may utilize computer vision, object/pattern recognition, object/pattern tracking, semantic analysis, and/or other visual analysis to detect the depiction of the physical whiteboard within the visual content.

Figure 4:
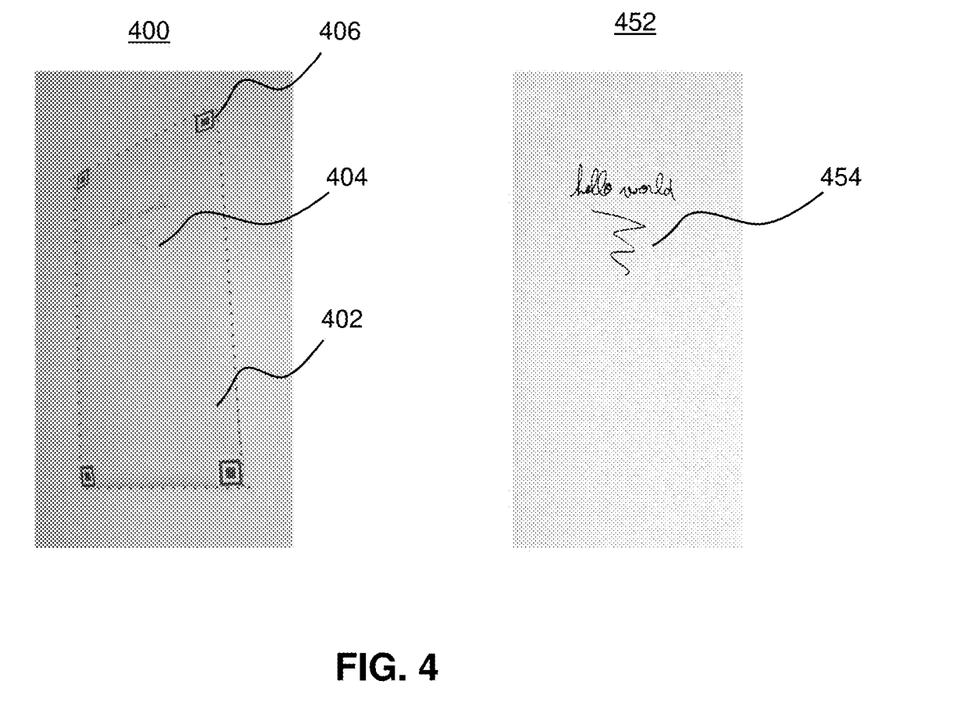
FIG. 4 illustrates an example digitization of a whiteboard.

For example, FIG. 4 illustrates an example image 400 captured by an image capture device. The image 400 may include depiction of a physical whiteboard 402. The visual content of the image 400 may be analyzed by the depiction component 104 to detect the depiction of the physical whiteboard 402.

In some implementations, one or more markers may be used to facilitate the detection/analysis of the visual content. For example, one or more machine-readable optical codes (e.g., barcodes, QR codes) may be positioned on the physical whiteboard to identify the physical whiteboard and/or the boundary/edges of the physical whiteboard. For example, referring to FIG. 4, the physical whiteboard 402 may include four marker 406 at the corners of the physical whiteboard. The markers 406 may convey information on the position, the shape, and/or other characteristics of the physical whiteboard 402. For example, the markers 406 may indicate the corners of the physical whiteboard 402. The markers 406 may be detected by the detection component 104 used to detect the depiction of the physical whiteboard 402 within the image 400 (e.g., determine the shape/boundary/edges of the physical whiteboard 402).

The generation component 106 may be configured to generate a virtual whiteboard. The virtual whiteboard may be generated based on the depiction of the physical whiteboard detected within the visual content and/or other information. The virtual whiteboard may be generated by creating a digital version of the physical whiteboard depicted within the visual content. The virtual whiteboard may be generated as a copy of the physical whiteboard depicted within the visual content. The virtual whiteboard may be generated by enhancing the physical whiteboard depicted within the visual content. The virtual whiteboard may include virtual markings that correspond to the physical markings on the physical whiteboard.

For example, a shape of the physical whiteboard within the visual content may be determined, and the shape of the virtual whiteboard may be modified based on the shape of the physical whiteboard and/or other information. The shape of the physical whiteboard within the visual content may be used to determine the deviation of the depiction from the expected shape of the whiteboard, and this deviation may be used to modify the shape of the virtual whiteboard. For instance, referring to FIG. 4, the shape of the physical whiteboard 402 within the image 400 may be determined. The shape may deviate from the expected rectangular shape of the whiteboard. A virtual whiteboard 452 may be generated from the depiction of the physical whiteboard 402. The shape of the virtual whiteboard 452 may be transformed to change the shape of the virtual whiteboard 452 into the expected rectangular shape.

Such transformation of the virtual whiteboard may result in projection correction for both the whiteboard and the markings on the whiteboard. For instance, referring to FIG.

4, the physical whiteboard 402 may include a marking 404 ("hello world" and a squiggly line). Generating the virtual whiteboard as an exact copy of the physical whiteboard 402 depicted within the image 400 may result in the virtual whiteboard and the virtual markings being slanted. By transforming the shape of the virtual whiteboard 452 into the expected shape, the shape of virtual marking 454 (digitized marking 404) may be corrected as well.

As another example, the generation component 106 may enhance the legibility of the virtual marking 452 by increasing the contrast between the marked and unmarked portions of the virtual whiteboard. For instance, referring to FIG. 4, portions of the virtual whiteboard 452 on which marking exists (the virtual marking 454) and on which markings do not exist may be detected. The portions of the virtual whiteboard 452 on which marking exists may be made sharper and/or darker. For example, a mask may be drawn to outline the virtual marking 454, and the portions of the virtual whiteboard 452 covered by the mask may be filled with one or more colors (e.g., the dominant color of the marking 404) to increase the legibility of the virtual marking 454. As another example, pixel cleaning may be performed on the background of the virtual whiteboard 452 to improve the background color. Other enhancements are contemplated.

The virtual whiteboard may be shared with one or more users to allow for virtual contributions by the user(s). For example, information defining the virtual whiteboard may be provided (e.g., transmitted, made available) to a computing device of a remote user. The computing device may use the information to provide a view of the virtual whiteboard. The computing device may receive changes to the virtual whiteboard from its user and transmit information defining the changes to the system 10.

The physical change component 108 may be configured to detect one or more changes in the depiction of the physical whiteboard within the visual content. Detecting a change in the depiction of the physical whiteboard within the visual content may include one or more of determining, discerning, discovering, finding, identifying, spotting, and/or otherwise detecting the change in the depiction of the physical whiteboard within the visual content. The change(s) in the depiction of the physical whiteboard within the visual content may be detected based on analysis of the visual content and/or other information. Analysis of the visual content may include examination, evaluation, processing, studying, and/or other analysis of the visual content.

The depiction of the physical whiteboard within the visual content may change based on changes to the physical whiteboard. For example, as the visual content is being captured by an image capture device, a local user may make a change to the markings on the physical whiteboard (e.g., add a new marking, erase/change an existing marking). The visual content captured by the image capture device may depict the changes to the physical whiteboard. The physical change component 108 may be configured to detect changes between the visual content captured at different moments to detect changes in the depiction of the physical whiteboard within the visual content.

In some implementations, the change(s) in the depiction of the physical whiteboard within the visual content may be detected based on: (1) segmentation of the depiction of the physical whiteboard from other depiction within the visual content to identify a target zone of the visual content that includes the depiction of the physical whiteboard; and (2) detection of the change(s) within the target zone of the visual content. Restricting the analysis to the target zone may reduce the cost (e.g., processing power, time) required to detect the change(s) in the depiction of the physical whiteboard within the visual content. Restricting the analysis to the target zone may include managing occlusions of the whiteboard.

For example, one or more parts of the physical whiteboard may not be visible at one or more moments within the capture duration. For example, the view of the physical whiteboard by the image capture device may be obstructed by a person standing between the image capture device and the physical whiteboard. Individual video frames that are captured by the image capture device may be segmented into zones of physical whiteboard depiction and zones of non-physical whiteboard depiction. The change(s) in the depiction of the physical whiteboard within the visual content may be detected using only the visual content (pixels) within the zones of physical whiteboard depiction. The visual content within the zones of non-physical whiteboard depiction may not be used to detect the change(s) in the depiction of the physical whiteboard within the visual content. To detect the change(s) in the depiction of the physical whiteboard within the visual content, the visual content within the zones of physical whiteboard depiction may be stored in memory and used to compare with the visual content that is subsequently captured.

Figure 5A:
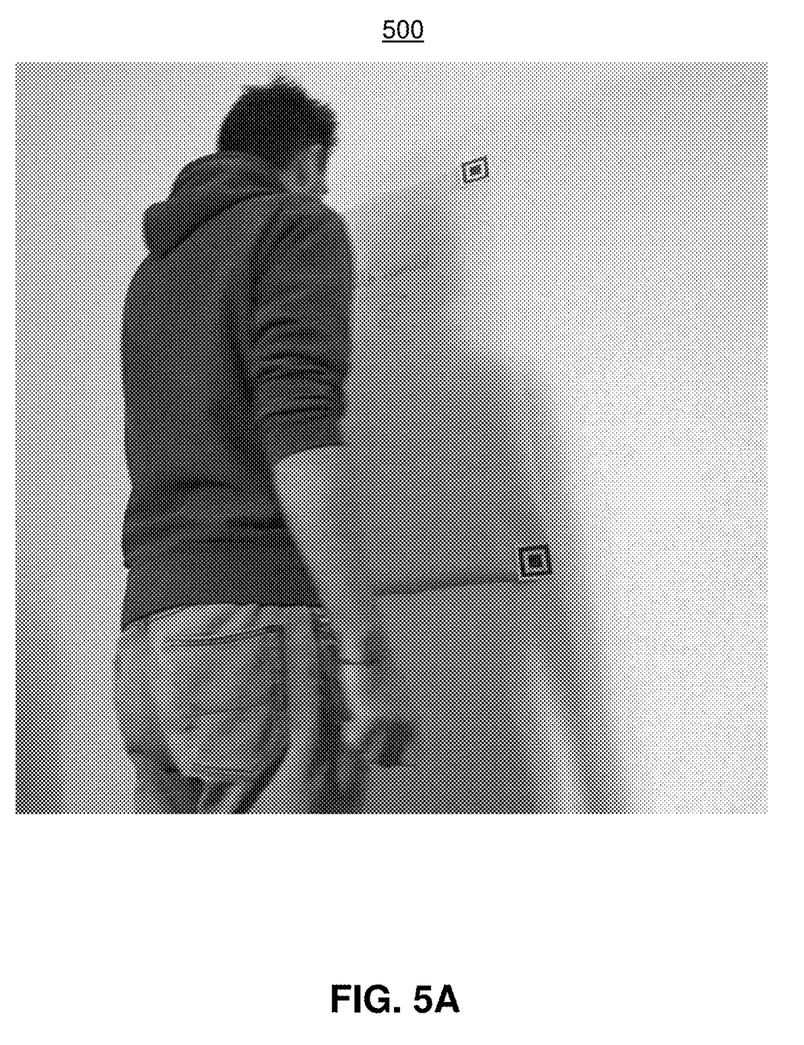
FIG. 5A illustrates example visual content including depiction of a whiteboard and depiction of a person.
Figure 5B:
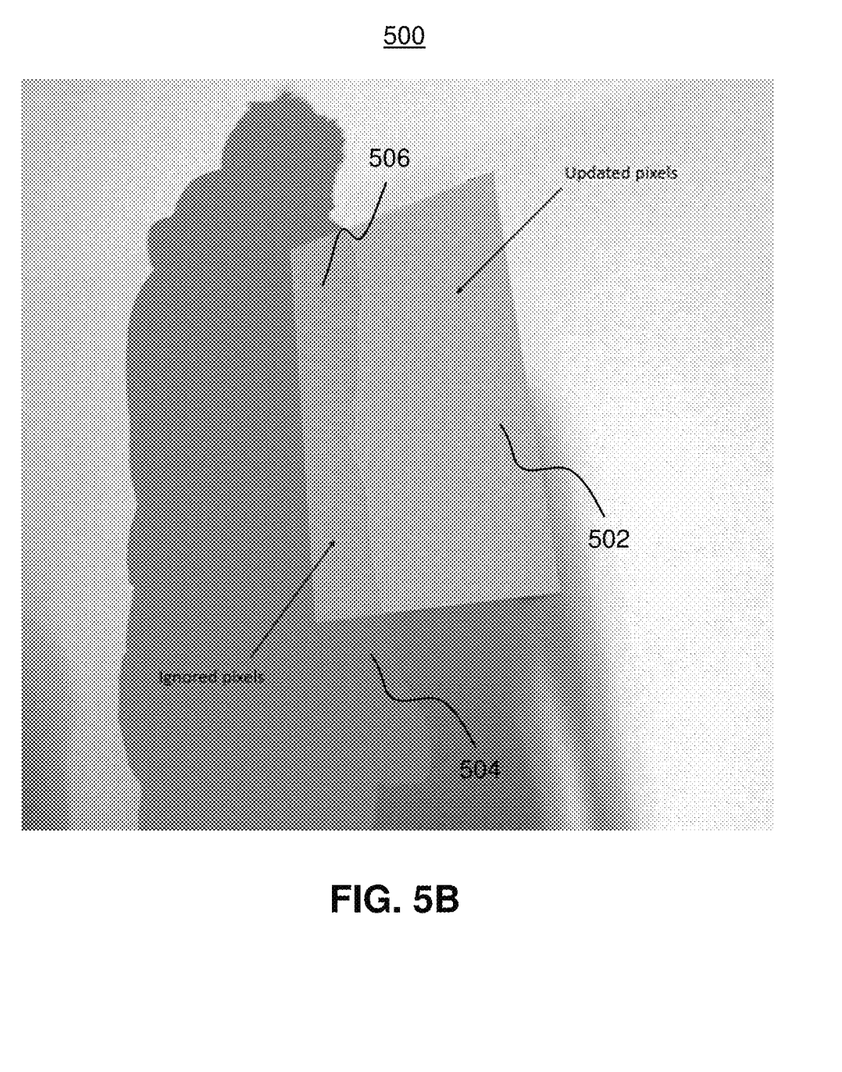
FIG. 5B illustrates example segmentation of depiction of a whiteboard from depiction of a person.

For example, FIG. 5A illustrates example visual content 500 including depiction of a whiteboard and depiction of a person. The visual content may be analyzed to segment the depiction of the whiteboard from the depiction of the person. The uncovered depiction of the whiteboard (not covered by the person) may be identified as a target zone of the visual content 500. For example, as shown in FIG. 5B, a portion the visual content 500 may be segmented from other depiction in the visual content 500 (depiction of the person 504, depiction of wall) as a target zone 502 of the visual content 500. The target zone may exclude a portion 506 of the whiteboard that is covered by the person. The change(s) in the depiction of the physical whiteboard within the visual content may be detected based analysis of the visual content within the target zone of the visual content 500. The portion 506 of the whiteboard that is covered by the person may be excluded from analysis to detect change(s) to the depiction of the physical whiteboard within the visual content.

In some implementations, the target zone of the visual content may be reidentified based on movement of the image capture device, movement of the physical whiteboard, and/or other information. If the position of the image capture device and the physical whiteboard has not been changed, then the target zone identified from previously captured images may be re-used to identify change(s) to the depiction of the physical whiteboard within the visual content. If the position of the image capture device and/or the physical whiteboard has been changed, the target zone may be reidentified.

In some implementations, the change(s) in the depiction of the physical whiteboard within the visual content may be detected based on video compression and/or other information. Video compression may refer to a process of reducing the amount of data (number of bits) needed to represent a sequence of images/video frames. For example, video compression may result in one or more video frames that include information for entire viewable dimensions of the video frames (e.g., I-frame) and one or more video frames that include information for portions of the viewable dimensions of the video frames (e.g., P-frame, B-frame). A video frame may include information regarding changes in the video frames from prior frames, subsequent frames, or both. The information regarding changes in the video frames may be used to detect the change(s) in the depiction of the physical whiteboard within the visual content.

The virtual change component 110 may be configured to receive one or more virtual changes to the virtual whiteboard. The virtual change(s) to the virtual whiteboard may be received from one or more users. The virtual change(s) to the virtual whiteboard may be received from one or more remote users (user(s) who are physically not at the location of the physical whiteboard) and/or one or more local users (user(s) who are physically at the location of the physical whiteboard). The virtual change(s) to the virtual whiteboard may be received from one or more users via the user(s) interaction with the system 10 and/or other computing devices. A virtual change to the virtual whiteboard may refer to a change made to the virtual whiteboard in a digital space. A virtual change to the virtual whiteboard may refer to a change to the virtual whiteboard made via user interaction with a computing device. For example, a virtual change to the virtual whiteboard may include addition of a new virtual marking on the virtual whiteboard and/or erasure/modification of an existing virtual marking on the virtual whiteboard.

For example, a virtual change to the virtual whiteboard may include change to a virtual marking that corresponds to a physical marking on the physical whiteboard. For instance, the virtual marking may include a copy of a physical marking on the physical whiteboard. A user may interact with the virtual whiteboard to change this virtual marking. As another example, a virtual change to the virtual whiteboard may include addition of one or more virtual media items to the virtual whiteboard. A virtual media items may include one or more of a virtual document, a virtual image, a virtual video, and/or other virtual media item. For instance, a user may embed an image or a video into the virtual whiteboard via interaction with the virtual whiteboard. A virtual media in the virtual whiteboard may be editable by one or more users.

In some implementations, a virtual media item may be added, changed, and/or removed from the virtual whiteboard via user interaction in the real world. For example, the placement of a virtual media item in the virtual whiteboard may be determined based on placement of a pattern/marker (e.g., barcode, QR code) corresponding to the virtual media item in the real world. For instance, a marker representing the virtual media item may be tagged onto the physical whiteboard at the desired location, and the virtual media item represented by the marker may be placed in the virtual whiteboard at the location corresponding to the location of the marker in real world. The marker may be moved within/on top of the physical whiteboard to change the location of the virtual media item within/on the virtual whiteboard. The virtual media item may be removed from the virtual whiteboard based on the marker being taking off the physical whiteboard.

The whiteboard change component 112 may be configured to change the virtual whiteboard. Changing the virtual whiteboard may include changing the entirety of the visual whiteboard and/or changing one or more portions of the virtual whiteboard. The virtual whiteboard may be changed based on the change(s) in the depiction of the physical whiteboard within the visual content and/or other information. That is, the whiteboard change component 112 may change the virtual whiteboard based on how the physical whiteboard changes in the real world. The virtual whiteboard may be changed by the whiteboard change component 112 to reflect/mirror the changes made to the physical whiteboard in the real world.

The virtual whiteboard may be changed based on the virtual change(s) to the virtual whiteboard received from the user(s) and/or other information. That is, the whiteboard change component 112 may change the virtual whiteboard based on how the user(s) alter the virtual whiteboard within the virtual space. The virtual whiteboard may be changed by the whiteboard change component 112 to include changes made by one or multiple users within the virtual space. Thus, the virtual whiteboard may include changes made in both the real world and in the virtual space.

The projection component 114 may be configured to project the change(s) to the virtual whiteboard. The change(s) to the virtual whiteboard may be projected on top of the physical whiteboard and/or other locations. The projection component 114 may differentiate between (1) the changes to the virtual whiteboard based on changes to the depiction of the physical whiteboard (changes made to the virtual whiteboard to mirror changes to the physical whiteboard) and (2) the changes to the virtual whiteboard based on virtual changes to the virtual whiteboard (changes made to the virtual whiteboard to mirror changes made in the virtual space). The projection component 114 may project on top of the physical whiteboard and/or other locations the change(s) to the virtual whiteboard based on the virtual change(s) to the virtual whiteboard. The projection component 114 may not project change(s) to the virtual whiteboard based on changes to the depiction of the physical whiteboard. That is, the projection may include images of changes made in the virtual space while not including change made in the real world.

For example, referring to FIG. 3, the projection component 114 may project images on top of the physical whiteboard 304. The images may be projected using a projector 312. The projector 312 may be an optical device that projects one or more images onto a surface. The projector 312 may project light using a light bulb, laser, and/or other projection techniques. The physical whiteboard 304 may be changed in the real world to include a physical marking 306. The virtual whiteboard may be changed to include a virtual marking that represents/mirrors the physical marking 306. The images projected by the projection component 114 may not include the physical marking 306. A virtual change to the virtual whiteboard may be received in the virtual space to include another marking, and the virtual whiteboard may be changed to include the new virtual marking. The images projected by the projection component 114 may include the new virtual marking to show a marking 308 on the physical whiteboard 304. Thus, the projector 312 may be used to project, on top of the physical whiteboard 304, virtual changes made to the virtual whiteboard.

In some implementations, the projection of the change(s) to the virtual whiteboard on top of the physical whiteboard may include projection of one or more changed images with the change(s) to the virtual whiteboard and projection of one or more blank images without the change(s) to the virtual whiteboard. A changed image may refer to an image that includes markings that represent/mirror the virtual changes to the virtual whiteboard. A blank image may refer to an image that does not include markings that represent/mirror the virtual changes to the virtual whiteboard. Some of the images that are projected on top of the physical whiteboard may include the change(s) to the virtual whiteboard while some of the images that are projected on top of the physical whiteboard may not include the change(s) to the virtual whiteboard. If the change(s) to the virtual whiteboard are always projected on top of the physical whiteboard, then it may be difficult to distinguish which markings are physical marking made on the physical whiteboard and which markings are virtual markings projected on top of the physical whiteboard. Projection of images with and without the change(s) to the virtual whiteboard may allow the image capture device to capture visual content that depicts only the physical whiteboard/physical changes made to the physical whiteboard.

In some implementations, a sequence of images that are projected on top of the physical whiteboard may include more changed images than blank images. One blank image may be shown for every two or more changed images. The system 10/the physical change component 108 may detect that the image that is shown less often as the blank image (not including virtual changes to the virtual whiteboard) and may use visual content captured during projection of such images to detect the physical changes to the physical whiteboard. In some implementations, capture, by the image capture device, of visual content depicting the physical whiteboard that includes less changes from prior visual capture of the physical whiteboard (without the projection of virtual changes) may be identified as capture of blank image(s). In some implementations, the system 10/the physical change component 108 may use a buffer of images/video frames that will feed the update and check for the stability of pixels.

In some implementations, the blank image(s) may include one or more markers to identify itself as the blank image(s) from which the other change(s) in the depiction of the physical whiteboard are to be detected. That is, while the blank image(s) that do not include the change(s) to the virtual whiteboard may include information that conveys to the system 10/the physical change component 108 that virtual change(s) are not being projected on top of the physical whiteboard and that the visual content/images of the physical whiteboard captured during this time may be used to detect change(s) to the physical whiteboard. One or more other changes in the depiction of the physical whiteboard within the visual content may be detected from the visual content captured while the projection includes the blank image(s) without the change to the virtual whiteboard. New changes to the physical whiteboard may be detected from visual content captured while blank image(s) are being projected on top of the physical whiteboard.

In some implementations, the changed image(s) with the change(s) to the virtual whiteboard may include one or more markers to identify itself as the changed image(s) from which the other change(s) in the depiction of the physical whiteboard are not to be detected. That is, the changed image(s) may include both change(s) to the virtual whiteboard and information that conveys to the system 10/the physical change component 108 that virtual change(s) are being projected on top of the physical whiteboard and that the visual content/images of the physical whiteboard captured during this time should not be used to detect change(s) to the physical whiteboard. Inclusion of such information may allow the system 10/the physical change component 108 to determine that markings being projected on top of the physical whiteboard should not be detected as physical changes to the physical whiteboard.

In some implementations, the changed image(s) may utilize one or more visual characteristics to distinguish the projection of the change(s) to the virtual whiteboard from the physical markings made on the physical whiteboard. The visual characteristic(s) that distinguish the projection of the change(s) to the virtual whiteboard from the physical markings made on the physical whiteboard may enable the system 10/the physical change component 108 to ignore the markings projected on the physical whiteboard when detecting physical changes to the physical whiteboard. For example, the markings that represent/mirror the virtual changes may be projected using a specific color and/or pattern that may be ignored by the system 10/the physical change component 108 when detecting physical changes to the physical whiteboard.

Figure 6:
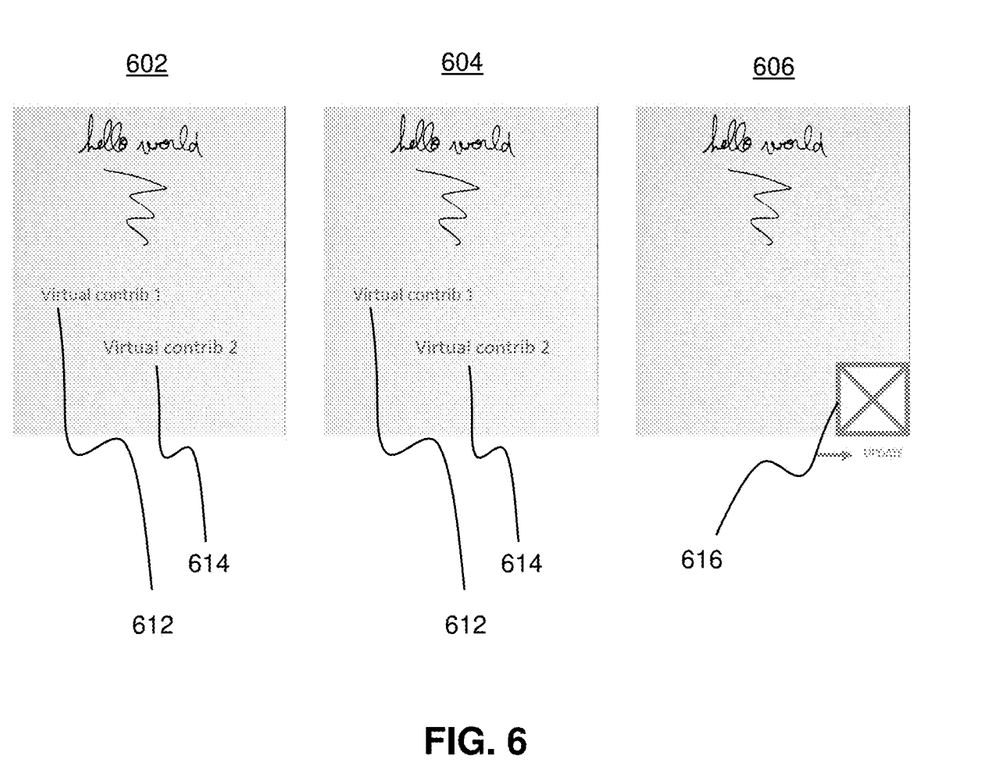
FIG. 6 illustrates example images to be projected on top of a whiteboard.

FIG. 6 illustrates example images to be projected on top of a whiteboard. As shown in FIG. 6, images 602, 604, 606 may be projected on top of the whiteboard in a sequence, starting with the image 602 and ending with the image 606. The images 602, 604 may include markings 612, 614 that represent/mirror virtual contributions (virtual change made in the virtual space) to the virtual whiteboard by one or more users. The image 606 may not include markings that represent/mirror virtual contributions to the virtual whiteboard by the user(s). The image 606 may include a marker 616 that identifies the image 606 as a blank image that does not include markings that represent/mirror virtual contributions. Projection of other sequence of blank and changed images is contemplated.

In some implementations, the visual content may be stored within one or more video files. For example, the visual content captured by the image capture device may be stored as a video recording. The visual content may have a progress length. One or more moments within the progress length corresponding to the change(s) in the depiction of the physical whiteboard may be flagged as one or more highlight moments (e.g., bookmarks). That change(s) that are flagged may include physical changes to the physical whiteboard and/or virtual changes to the virtual whiteboard (which are projected on top of the physical whiteboard). In some implementations, moments corresponding to the physical changes may be flagged based on analysis of the visual content (e.g., based on detection of changes in the depiction of the physical whiteboard by the physical change component 108). In some implementations, moments corresponding to the virtual changes may be flagged based on reception of virtual changes from the user(s) (e.g., based on reception of virtual change(s) to the virtual whiteboard by the virtual change component 110). Highlight moments may be identified based on detection of both physical changes to the physical whiteboard and virtual changes to the virtual whiteboard. A user may use the highlight moments to quickly identify moments in the video that include changes to the whiteboard. A user may use the highlight moments to quickly skip to the moments in the video that include changes to the whiteboard. In some implementations, highlight moments for physical changes and virtual changes may be identified differently to enable a user to differentiate between when changes were made in the real world and when changes were made in the virtual space.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
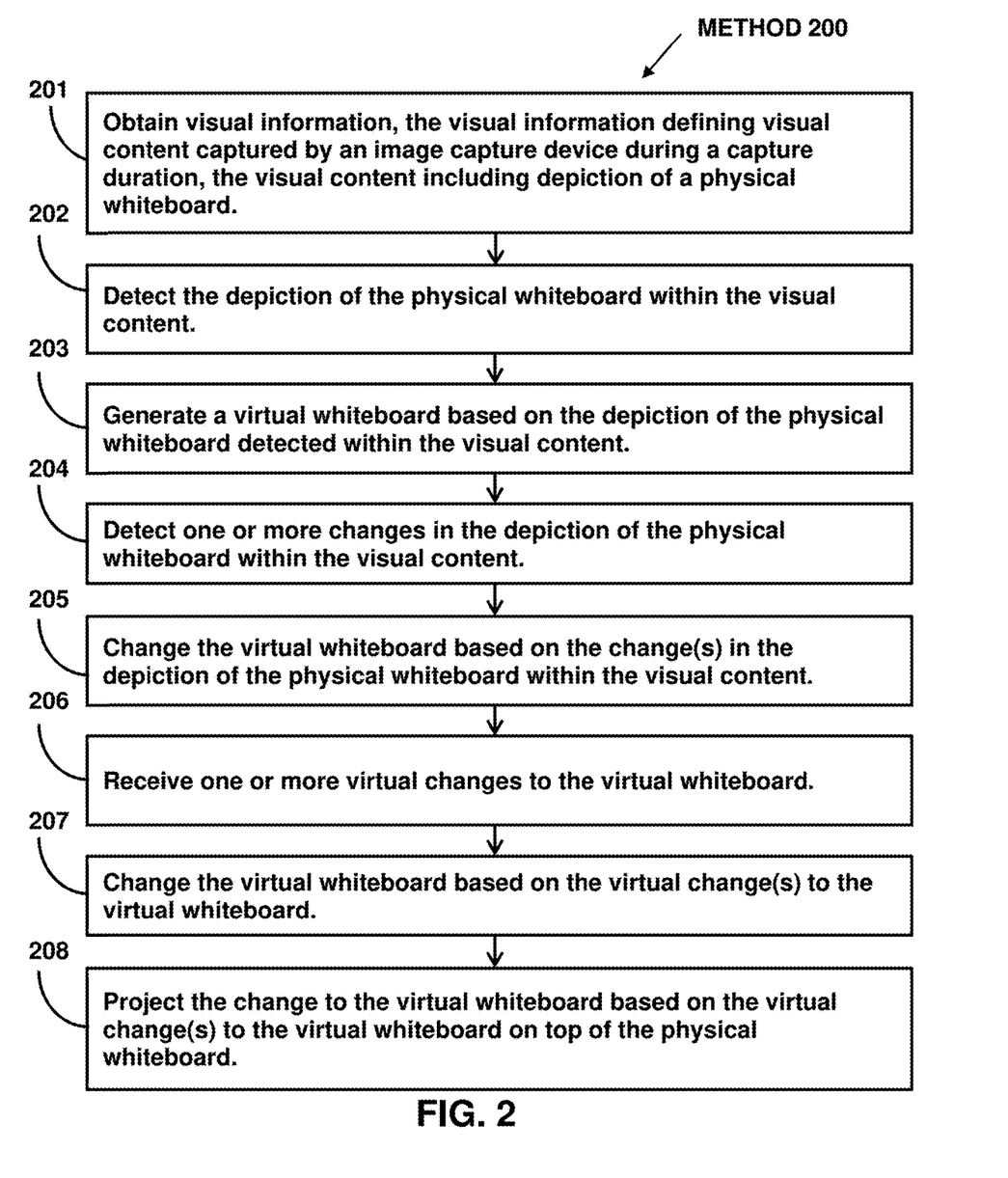
FIG. 2 illustrates a method for digitizing whiteboards.

FIG. 2 illustrates method 200 for digitizing whiteboards. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, visual information and/or other information may be obtained. The visual information may define visual content captured by one or more image capture devices during a capture duration. The visual content may include depiction of a physical whiteboard. In some implementations, operation 201 may be performed by a processor component the same as or similar to the visual information component 102 (Shown in FIG. 1 and described herein).

At operation 202, the depiction of the physical whiteboard within the visual content may be detected. In some implementations, operation 202 may be performed by a processor component the same as or similar to the depiction component 104 (Shown in FIG. 1 and described herein).

At operation 203, a virtual whiteboard may be generated based on the depiction of the physical whiteboard detected within the visual content and/or other information. In some implementations, operation 203 may be performed by a processor component the same as or similar to the generation component 106 (Shown in FIG. 1 and described herein).

At operation 204, one or more changes in the depiction of the physical whiteboard within the visual content may be detected. In some implementations, operation 204 may be performed by a processor component the same as or similar to the physical change component 108 (Shown in FIG. 1 and described herein).

At operation 205, the virtual whiteboard may be changed based on the change(s) in the depiction of the physical whiteboard within the visual content and/or other information. In some implementations, operation 205 may be performed by a processor component the same as or similar to the whiteboard change component 112 (Shown in FIG. 1 and described herein).

At operation 206, one or more virtual changes to the virtual whiteboard may be received. In some implementations, operation 206 may be performed by a processor component the same as or similar to the virtual change component 110 (Shown in FIG. 1 and described herein).

At operation 207, the virtual whiteboard may be changed based on the virtual change(s) to the virtual whiteboard and/or other information. In some implementations, operation 207 may be performed by a processor component the same as or similar to the whiteboard change component 112 (Shown in FIG. 1 and described herein).

At operation 208, the change to the virtual whiteboard based on the virtual change(s) to the virtual whiteboard may be projected on top of the physical whiteboard. In some implementations, operation 208 may be performed by a processor component the same as or similar to the projection component 114 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for digitizing whiteboards, the system comprising:
one or more physical processors configured by machine-readable instructions to:
obtain visual information, the visual information defining visual content captured by an image capture device during a capture duration, the visual content including depiction of a physical whiteboard;
detect the depiction of the physical whiteboard within the visual content;
generate a virtual whiteboard based on the depiction of the physical whiteboard detected within the visual content;
receive a virtual change to the virtual whiteboard;
change the virtual whiteboard based on the virtual change to the virtual whiteboard;
project the change to the virtual whiteboard on top of the physical whiteboard, the projection of the change to the virtual whiteboard on top of the physical whiteboard including projection of a sequence of images on top of the physical whiteboard, the sequence of images including images with the change to the virtual whiteboard and images without the change to the virtual whiteboard, wherein the projection of the images without the change to the virtual whiteboard facilitates detection of physical changes to the physical whiteboard;
detect a change in the depiction of the physical whiteboard within the visual content captured during the projection, on top of the physical whiteboard, of the images without the change to the virtual whiteboard, the change in the depiction of the physical whiteboard corresponding to a physical change to the physical whiteboard; and
change the virtual whiteboard based on the change in the depiction of the physical whiteboard within the visual content.

2. The system of claim 1, wherein the change in the depiction of the physical whiteboard within the visual content is detected based on:
segmentation of the depiction of the physical whiteboard from other depiction within the visual content to identify a target zone of the visual content that includes the depiction of the physical whiteboard; and
detection of the change within the target zone of the visual content.

3. The system of claim 2, wherein the target zone of the visual content is reidentified based on movement of the image capture device.

4. The system of claim 1, wherein the sequence of images includes more of the images with the change to the virtual whiteboard than the images without the change to the virtual whiteboard.

5. The system of claim 1, wherein the virtual change to the virtual whiteboard includes addition of a virtual media item to the virtual whiteboard.

6. The system of claim 5, wherein the virtual media item includes a virtual document, a virtual image, or a virtual video.

7. The system of claim 1, wherein the images with the change to the virtual whiteboard include one or more markers, the one or more markers indicating that the marked images include the change to the virtual whiteboard and are not to be used to detect physical changes to the physical whiteboard.

8. The system of claim 1, wherein the images without the change to the virtual whiteboard include one or more markers, the one or more markers indicating that the marked images do not include the change to the virtual whiteboard and are to be used to detect physical changes to the physical whiteboard.

9. The system of claim 1, wherein the visual content is stored within a video file, the visual content having a progress length, and a moment within the progress length corresponding to the change in the depiction of the physical whiteboard is flagged as a highlight moment.

10. A method for digitizing whiteboards, the method performed by a computing system including one or more processors, the method comprising:
obtaining, by the computing system, visual information, the visual information defining visual content captured by an image sensor of an image capture device during a capture duration, the visual content including depiction of a physical whiteboard;
detecting, by the computing system, the depiction of the physical whiteboard within the visual content;
generating, by the computing system, a virtual whiteboard based on the depiction of the physical whiteboard detected within the visual content;

receiving, by the computing system, a virtual change to the virtual whiteboard;

changing, by the computing system, the virtual whiteboard based on the virtual change to the virtual whiteboard;

projecting, by the computing system, the change to the virtual whiteboard on top of the physical whiteboard, the projection of the change to the virtual whiteboard on top of the physical whiteboard including projection of a sequence of images on top of the physical whiteboard, the sequence of images including images with the change to the virtual whiteboard and images without the change to the virtual whiteboard, wherein the projection of the images without the change to the virtual whiteboard facilitates detection of physical changes to the physical whiteboard;

detecting, by the computing system, a change in the depiction of the physical whiteboard within the visual content captured during the projection, on top of the physical whiteboard, of the images without the change to the virtual whiteboard, the change in the depiction of the physical whiteboard corresponding to a physical change to the physical whiteboard; and changing, by the computing system, the virtual whiteboard based on the change in the depiction of the physical whiteboard within the visual content.

11. The method of claim 10, wherein the change in the depiction of the physical whiteboard within the visual content is detected based on:

segmentation of the depiction of the physical whiteboard from other depiction within the visual content to identify a target zone of the visual content that includes the depiction of the physical whiteboard; and detection of the change within the target zone of the visual content.

12. The method of claim 11, wherein the target zone of the visual content is reidentified based on movement of the image capture device.

13. The method of claim 10, wherein the sequence of images includes more of the images with the change to the virtual whiteboard than the images without the change to the virtual whiteboard.

14. The method of claim 10, wherein the virtual change to the virtual whiteboard includes addition of a virtual media item to the virtual whiteboard.

15. The method of claim 14, wherein the virtual media item includes a virtual document, a virtual image, or a virtual video.

16. The method of claim 10, wherein the images with the change to the virtual whiteboard include one or more markers, the one or more markers indicating that the marked images include the change to the virtual whiteboard and are not to be used to detect physical changes to the physical whiteboard.

17. The method of claim 10, wherein the images without the change to the virtual whiteboard include one or more markers, the one or more markers indicating that the marked images do not include the change to the virtual whiteboard and are to be used to detect physical changes to the physical whiteboard.

18. The method of claim 10, wherein the visual content is stored within a video file, the visual content having a progress length, and a moment within the progress length corresponding to the change in the depiction of the physical whiteboard is flagged as a highlight moment.

19. A system for digitizing whiteboards, the system comprising:

one or more physical processors configured by machine-readable instructions to:

obtain visual information, the visual information defining visual content captured by an image capture device during a capture duration, the visual content including depiction of a physical whiteboard;

detect the depiction of the physical whiteboard within the visual content;

generate a virtual whiteboard based on the depiction of the physical whiteboard detected within the visual content;

receive a virtual change to the virtual whiteboard;

change the virtual whiteboard based on the virtual change to the virtual whiteboard;

project the change to the virtual whiteboard on top of the physical whiteboard, the projection of the change to the virtual whiteboard on top of the physical whiteboard including projection of a sequence of images on top of the physical whiteboard, the sequence of images including images with the change to the virtual whiteboard and images without the change to the virtual whiteboard, the sequence of images including more of the images with the change to the virtual whiteboard than the images without the change to the virtual whiteboard, wherein the projection of the images without the change to the virtual whiteboard facilitates detection of physical changes to the physical whiteboard;

detect a change in the depiction of the physical whiteboard within the visual content captured during the projection, on top of the physical whiteboard, of the images without the change to the virtual whiteboard, the change in the depiction of the physical whiteboard corresponding to a physical change to the physical whiteboard; and change the virtual whiteboard based on the change in the depiction of the physical whiteboard within the visual content.

20. The system of claim 19, wherein:

the images with the change to the virtual whiteboard include one or more first markers, the one or more first markers indicating that the marked images include the change to the virtual whiteboard and are not to be used to detect physical changes to the physical whiteboard; or the images without the change to the virtual whiteboard include one or more second markers, the one or more second markers indicating that the marked images do not include the change to the virtual whiteboard and are to be used to detect physical changes to the physical whiteboard.

\* \* \* \* \*